United States Patent Office 3,060,100
Patented Oct. 23, 1962

3,060,100
MANUFACTURE OF NEW PRODUCTS OF
ENZYMATIC OXIDATION
Albert Wettstein, Ernst Vischer, and Friedrich Werner
Kahnt, Basel, Charles Meystre, Arlesheim, and Robert
Neher, Binningen, Switzerland, assignors to Ciba Corporation, a corporation of Delaware
No Drawing. Filed Jan. 31, 1955, Ser. No. 485,324
Claims priority, application Switzerland Feb. 5, 1954
14 Claims. (Cl. 195—51)

This invention relates to a novel process for introducing oxygen into certain steroids, as well as to certain novel steroids obtained thereby.

It is known to introduce oxygen, especially hydroxyl groups in the 11$\beta$- and 11$\alpha$-position and also oxo groups in the 11-position of 11-desoxy steroids by biochemical methods, for example, by means of suprarenal glands especially with the use of their homogenates or by perfusion and also by microbiological methods. The starting materials used always contain the methyl group in 13-position typical of steroids.

We have now found that especially interesting physiological products such as aldosterone, can be obtained by starting from 11-desoxy steroids which contain in the 13-position a free or functionally converted oxygenated methyl group. Such compounds are obtainable, for example, by total synthesis in a manner analogous to the process described in the application of T. Reichstein et al., Ser. No. 480,061, filed January 5, 1955, and now U.S. Patent No. 2,904,545, or by the process described in the application of T. Reichstein et al., Ser. No. 480,062, filed January 5, 1955 and now abandoned, or by the process described in the Swiss application of Ciba Aktiengesellschaft No. 14,580, filed January 7, 1955.

In accordance with this invention the new products of enzymatic oxidation are made by subjecting a 3,18,20-trioxygenated-11-desoxy-pregnane derivative or a functional derivative thereof, and more particularly a 3,18,20-trioxygenated-11-desoxypregnene, to the aerobic action of an enzyme which is capable of introducing oxygen into the 11-position, and isolating the oxygenated substance. As starting materials and end products of the new processes there are included among pregnane derivatives also compounds of the homo- and nor-pregnane series, for example, those derived from 19-nor- and/or D-homo-pregnane, the side chain of the latter being present more especially in the 17a-position. The starting materials may be of any desired steric configuration and may also be racemates, and contain at the 3-, 18- and 20-carbon atoms free or functionally converted hydroxyl and/or oxo groups, for example, ester, ether, thioester, thiol- and thionester, acetal, mercaptal, ketal, hydrazone or semicarbazone groups, and also enol groups, such as those of enol esters, enol ethers or enamines and the like. Furthermore they may contain additional substituents except in the 11-position. Double bonds may be present, for example, in the 1-, 4-, 5-, 6-, 7-, 14-, 15-, and/or 16-position. Especially useful are saturated or unsaturated 3,18,20,21-tetra-oxygenated pregnane derivatives which may also be oxygenated in the 16- and/or 17-positions, and advantageously 3,18,20-trioxo-, 3,20-dioxo-18-hydroxy-, 3,18-dihydroxy-20-oxo-, 3,18-dioxo-20-hydroxy, 3-hydroxy-18,20-dioxo-, 3,20-dihydroxy-18-oxo, 18,20-dihydroxy-3-oxo- or 3,18,20-trihydroxy-pregnane derivatives, corresponding compounds containing a hydroxyl or an oxo group in the 21-position and also functional derivatives of all these compounds.

The enzymes used may be of microbiological origin, the starting materials being aerobically incubated, for example, together with living micro-organisms which are capable of introducing oxygen into the 11-position. Alternatively, the enzymes may be separated more or less completely from the culture filtrate or from the micro-organisms and then the treatment is carried out in the presence of the enzymes per se without the living micro-organisms being present. The micro-organisms, for example, those of the groups Mucorales, Penicillium, Actinomycetes such as Streptomycetes, Aspergillus, Cunninghamella, Curvularia or Fungi Imperfecti, are grown in known manner, for example, in static or submerged cultures in motion, which advantageously contain carbon in a form capable of being assimilated, especially, carbohydrates. The most simple process to carry out in practice is described below, but without limiting the invention to this procedure: The organisms are grown in apparatus and under conditions similar to those known in the manufacture of antibiotics, as the so called deep tank process. After developing the cultures, the aforesaid starting materials are added in fine dispersion or in solution, for example, in methanol, acetone or ethylene glycol, and further incubated. Finally the mycelium is separated, the filtrate and/or the mycelial mass is extracted, and the reaction products are isolated from the extract in known manner, for example, by a demixing process, adsorption, chromatography, crystallization, conversion into functional derivatives such as Girard compounds or the like.

Instead of enzymes of microbiological origin there may be used, for example, those from animal organs especially suprarenal glands. The process used for this purpose comprises perfusion of the organs and especially the use of homogenates or fractions thereof like the residue or the supernatant after centrifugation.

The products of the process can be used as medicaments and as intermediate products for making medicaments. Of very great practical interest are, more especially, aldosterone and the compounds closely related to it in structure, namely, $\Delta^4$-3,20-dioxo-11,18,21-trihydroxy-pregnenes, $\Delta^4$ - 3,11,20 - trioxo - 18,21 - dihydroxy-pregnenes and $\Delta^4$-3,11,18,20-tetraoxo-21-hydroxy-pregnenes, corresponding compounds with an additional 17-hydroxyl, and functional derivatives thereof. These compounds are useful in the treatment of conditions where aldosterone is employed. The compounds can be employed orally or parenterally in combination with pharmaceutical adjuvants as carriers to facilitate their administration.

The following examples illustrate the invention:

*Example 1*

4 liters of a nutrient solution containing 40 grams of crude glucose, 240 cc. of cornsteep liquor, 20 grams of sodium chloride, 4 grams of calcium carbonate and tap water, are adjusted to a pH value of 6.6 by means of dilute caustic soda solution. The nutrient solution is divided among 12 Erlenmeyer flasks each of 1 liter capacity, and the solutions are sterilized. After inoculating the solutions with *Cunninghamella blakesleeana*, the flasks are mechanically agitated at 26° C. After 60 hours a solution of 1.0 grams of $\Delta^4$-3,20-dioxo-18,21-di-hydroxy-pregnene in 40 cc. of methanol is added simultaneously under sterile conditions to the well developed cultures, which are then shaken at 26° C. for a further 48 hours. The mycelium is separated and the culture filtrate (pH value 8.2) is exhaustively extracted by agitation with ethyl acetate. The extract is washed with 0.1 N-hydrochloric acid, a sodium hydrogen carbonate solution of 2% strength and water, and then dried over sodium sulphate and evaporated in vacuo at 30° C. The residue (980 milligrams) is taken up in warm benzene, and chromatographed by the method of fractional elution on a column of 30 grams of silica gel prepared with benzene. It is elutriated several times on each occasion with 100 cc. of benzene, ether, a mixture of ether and ethyl acetate (9:1), a mixture of ether and ethyl acetate (8:2), a mixture of ether and ethyl lactate (1:1), ethyl acetate, a mixture of ethyl acetate and methanol, (9:1), a mixture of ethyl acetate and methanol (8:2) and methanol. By subjecting the individual fractions to tests by paper chromatography it is found that the first fractions contain starting material and the mixture of ethyl acetate and methanol and the methanol fractions contain a mixture of highly polar products. On the other hand, there can be isolated from the middle fractions a compound which is more highly polar than the starting material. It contains a $\Delta^4$-3-keto-group (ultra violet $\lambda_{max}=241$ m$\mu$), an $\alpha$-ketol side chain (reduction capacity) and an additional oxygen atom (by analysis). The resulting $\Delta^4$ - 3,20 - dioxo-11$\beta$,18,21-trihydroxy-pregnene can be further purified by recrystallization from a mixture of acetone, ether and petroleum ether.

Example 2

4 liters of a nutrient solution containing 60 grams of peptone, 25 cc. of cornsteep liquor, 200 milligrams of crude glucose and tap water, are given a pH value of 6.5 by means of a dilute solution of caustic soda, and the solution is divided among 12 Erlenmeyer flasks each of 1 liter capacity and the solutions are sterilized. After inoculation with Rhizopus nigricans, the flasks are mechanically agitated at 25° C. After 48 hours the cultures have developed well. Under sterile conditions a solution of 1.0 gram of $\Delta^4$-3,20-dioxo-18-hydroxypregnene in 40 cc. of methanol is simultaneously distributed among the 12 Erlenmeyer flasks, and the mixtures are agitated for a further 48 hours at 25° C. After separating the mycelium the extractions and chromatographic working up of the extract are carried out in the manner described in Example 1. Paper chromatographic tests of the individual chromatographic fractions shows that the ethyl acetate-methanol and the ethyl acetate fractions contain a highly polar mixture, whereas there can be isolated from the ether-ethyl acetate and ethyl acetate fractions a substance which is more (highly) polar than the starting material. Determination of the carbon and hydrogen contents shows that one atom of oxygen has entered into combination, and the ultra violet spectrum ($\lambda_{max}=241$ m$\mu$) indicates the presence of the $\Delta^4$-3-keto-grouping. By reprecipitations from mixtures of acetone, ether and petroleum ether there is obtained $\Delta^4$-3,20-dioxo-11$\alpha$,18-dihydroxy-pregnene.

Example 3

12 cultures of Cunninghamella blakesleeana are prepared as described in Example 1. A solution of 1.0 gram of $\Delta^4$-3,18,20-trioxo-21-hydroxy-pregnene in 40 cc. of acetone is added simultaneously under sterile conditions. After agitating the mixture for 48 hours at 26° C. the mycelium is separated off and the culture filtrate (pH value=8.0) is extracted with ethyl acetate while cooling. The extract is washed with ice water, dried, evaporated at room temperature, the residue (950 milligrams) is dissolved in methylene chloride, and chromatographed on 30 grams of silica gel by the method of fractional elution. Elutriation is carried out several times on each occasion with 100 cc. of methylene chloride, chloroform, a mixture of chloroform and acetone (9:1), a mixture of chloroform and acetone (1:1), and acetone. Tests by paper chromatography show the presence of starting material in the first chloroform fractions and highly polar products in the acetone fractions. The final chloroform fractions contain a compound having a somewhat stronger polarity than 11-desoxycorticosterone, and there is present in the chloroformacetone fractions a compound which responds to paper chromatographic tests almost in the same manner as cortisone. This compound is isolated from the uniform fractions and purified by recrystallization from a mixture of acetone and ether. The resulting aldosterone in its semiacetal form (18,11- cyclo-semiacetal of the $\Delta^4$-3,18,20-trioxo-11$\beta$:21-dihydroxy-pregnene) melts at 165–168° C.

By starting from the 21-acetate the same compound is obtained. Its diacetate melts unsharply at 70–72° C., its 18-monoacetate obtained therefrom by partial hydrolysis with sodium bicarbonate at room temperature melts at 220° C., and the monoacetate obtained by partial acetylation melts at 190–192° C.

The starting materials of the above examples can be obtained according to Swiss specification No. 14,580 of January 7, 1955 by subjecting a steroid with a methyl group in 13-position to the oxidizing action of an enzyme which is capable of introducing a hydroxyl group, and separating any steroid hydroxylated in 18-position and, if desired, subjecting the latter to further oxidation. $\Delta^4$-3,20-dioxo-18,21-dihydroxy-pregnene is prepared, for example, as follows:

333 grams of suprarenal glands of cows are freed from any adhering fat immediately after slaughtering, and after being disintegrated are mixed with 340 cc. of an ice-cold saccharose solution which contains per liter 68.4 grams of saccharose, 3.62 grams of sodium chloride, 3.56 grams of secondary sodium phosphate, 1.86 grams of potassium chloride, 1.16 grams of fumaric acid and 3 grams of nicotinic acid amide. The mixture is homogenized for 12 minutes in the cold, the pH being maintained at 7.6–7.8 by the addition of caustic soda solution. The homogenate which amounts to 550 cc. is mixed with an equal volume of a salt solution having a pH value of 7.5 and containing per liter 3.62 grams of sodium chloride, 3.56 grams of secondary sodium phosphate, 1.86 grams of potassium chloride and 4.64 grams of fumaric acid. To this reaction mixture there are added 100 cc. of a magnesium sulfate solution of 1% strength, 505 mg. of sodium salt of adenosine triphosphate, 101 mg. of diphosphopyridine nucleotide (Cozymase) and 10.6 mg. of triphosphospyridine nucleotide. 3.3 cc. of a cortexone solution of 10 percent strength in ethanol are added to the solution dropwise while stirring, and the pH value adjusted to 7.4. At 35° C. oxygen is passed through the reaction solution for 3 hours (2 liters per minute), the pH being kept constant. The reaction solution is then stirred into 8 liters of freshly distilled acetone, the mixture allowed to stand in the cold while being stirred occasionally, and the resulting precipitate separated from the solution by filtration with suction. The residue is washed three times with 1 liter of acetone at 40° C. each time, the acetone solutions are combined, evaporated in vacuo at 35–40° C. under nitrogen to 250 cc. This aqueous fat suspension is then defatted by extraction 4 times with 0.3 part by volume of petroleum ether boiling at 50–70° C. each time and by extraction 4 times with 0.5 part by volume of freshly distilled ethylene chloride.

A preliminary purification is obtained by dissolving the ethylene chloride extract containing the corticosteroids (about 250 mg.) in a little chloroform and adsorption on 5 grams of silica gel in chloroform. The column is first washed with 80 cc. of a mixture of chloroform and acetone 99:1, and the corticosteroids are then eluated with 100 cc. of a mixture of chloroform and acetone 1:1. The eluate (135 mg.) is then paper chromatographed on a preparative scale for the purpose of further separation. It is applied to the starting line of seven sheets of cellulose, 20 cm. in width (Whatman No. 1) which have been previously impregnated with formamide and chromatographed with chloroform-benzene 1:1 until the solvent reaches the front of the sheet of paper. The dried chromatogram is then photoprinted in the U.V., the bands corresponding to the 18-hydroxy-cortexone are cut out (between corticosterone and cortisone) and extracted with methanol of 20 percent strength. The eluate is concentrated in vacuo to half its volume and extracted 5 times with an equal volume of chloroform. After drying the chloroform solution over sodium sulfate it is distilled off in vacuo. The residue is dried in high vacuum.

Paper chromatography is then carried out on a preparative scale in the system benzene-methanol-water 10:5:5. The dried chromatogram is photoprinted in the ultra violet spectrum. The bands corresponding to 18-hydroxy-cortexone are cut out ($R_f$ value somewhat smaller than that for corticosterone) and eluated with absolute methanol. After evaporating the solvent, an amorphous residue remains which soon begins to crystallize. The crystals are washed with ether and recrystallized from ether-acetone 3:1. 18-hydroxy-cortexone is thus obtained in the form of colorless needles melting at 194–204° C. In various other paper-chromatographic systems also, such as for example, formamide-chloroform, propyleneglycol-toluene, formamide-benzene or petroleum ether-methanol-water, the 18-hydroxy-cortexone migrates between $\Delta^4$-3,20-dioxo-17$\alpha$,21-dihydroxy-pregnene and $\Delta^4$-3,20-dioxo-11$\alpha$,21-dihydroxy-pregnene. It has reducing properties in relation to silver diamine or blue tetrazolium salts, exhibits a yellow fluorescence after treatment with caustic soda solution and only a very faint blue-violet fluorescence after treatment with phosphoric acid of 15 percent strength. In the ultra-violet spectrum a strong band can be observed: $\lambda_{max.}$ 239 m$\mu$. The analysis corresponds to the empirical formula $C_{21}H_{30}O_4$. In the infrared absorption spectrum (taken on a Perkin-Elmer double-beam instrument, model 21, in methylene chloride solution, layer thickness 0.2 mm., compensated with methylene chloride of the same thickness of layer) characteristic bands are to be seen inter alia at 2.76$\mu$, 2.80–2.85$\mu$ (hydroxyl groups), 5.83$\mu$ (medium), 5.94$\mu$ (strong), 6.17$\mu$ (medium) in the double bond region and at 6.90$\mu$, 7.08$\mu$, 7.21$\mu$, 7.38$\mu$, 7.25$\mu$, 8.15$\mu$, 8.43$\mu$, 9.32$\mu$, 9.44$\mu$ and 9.84$\mu$ in the fingerprint region.

What is claimed is:

1. A process for the manufacture of new products of enzymatic oxidation oxygenated in the 11-position which comprises subjecting a member selected from the group consisting of a 3,18,20-trioxygenated-11-desoxypregnane and a derivative thereof unsaturated in the steroid nucleus to the aerobic action of an enzyme of microbiological origin selected from the group consisting of *Rhizopus nigricans* and *Cunninghamella blakesleeana*.

2. A process as claimed in claim 1, which comprises using a 3,18,20,21-tetra-oxygenated pregnene as starting material.

3. A process as claimed in claim 1, which comprises using a 3,17,18,20,21-penta-oxygenated pregnene as starting material.

4. A process as claimed in claim 1, which comprises using a 3,17,18,20-tetra-oxygenated pregnene as starting material.

5. A process as claimed in claim 1, which comprises using a $\Delta^4$-3,18,20-trioxo-pregnene as starting material.

6. A process as claimed in claim 1, which comprises using a $\Delta^4$-3,20-dioxo-18-hydroxy-pregnene as starting material.

7. A process as claimed in claim 1, which comprises using a compound of the constitution described which contains in 21-position a member selected from the group consisting of a hydroxyl, an oxo, a functionally converted hydroxyl and a functionally converted oxo group.

8. A process as claimed in claim 1, which comprises using a compound of the constitution described which contains in 17-position a member selected from the group consisting of a hydroxyl and functionally converted hydroxyl group.

9. A process as claimed in claim 1, which comprises using a $\Delta^4$-3,18,20-trioxo-21-hydroxy-pregnene as starting material.

10. A process as claimed in claim 1, which comprises using a $\Delta^4$-3,18,20-trioxo-17,21-dihydroxy-pregnene as starting material.

11. A process as claimed in claim 1, which comprises using a $\Delta^4$-3,20-dioxo-18,21-dihydroxy-pregnene as starting material.

12. A process as claimed in claim 1, which comprises using a $\Delta^4$-3,20-dioxo-17,18,21-trihydroxy-pregnene as starting material.

13. A process as claimed in claim 6, in which submerged cultures in motion are employed.

14. A process for producing aldosterone which comprises subjecting $\Delta^4$-3,18,20-trioxo-21-hydroxy-pregnene to the aerobic oxidation of an enzyme which is capable of introducing oxygen into the 11-position, said enzymes being selected from the group consisting of *Rhizopus nigricans* and *Cunninghamella blakesleeana*.

References Cited in the file of this patent

UNITED STATES PATENTS

| | | |
|---|---|---|
| 2,602,769 | Murray | July 8, 1952 |
| 2,649,402 | Murray | Aug. 18, 1953 |
| 2,658,022 | Haines et al. | Nov. 3, 1953 |
| 2,658,023 | Shull | Nov. 3, 1953 |
| 2,666,016 | Hechter | Jan. 1, 1954 |
| 2,671,095 | Levin | Mar. 2, 1954 |
| 2,676,904 | Jeanloz | Apr. 27, 1954 |
| 2,686,780 | Levin | Aug. 17, 1954 |
| 2,694,080 | Colton | Nov. 9, 1954 |
| 2,702,810 | Murray | Feb. 22, 1955 |
| 2,705,711 | Dodson | Apr. 5, 1955 |

UNITED STATES PATENT OFFICE
CERTIFICATE OF CORRECTION

Patent No. 3,060,100                           October 23, 1962

Albert Wettstein et al.

It is hereby certified that error appears in the above numbered patent requiring correction and that the said Letters Patent should read as corrected below.

Column 6, line 31, for "$A^4$-3,18,20-" read -- $\Delta^4$-3,18,20- --.

Signed and sealed this 5th day of May 1964.

AL)
est:
EST W. SWIDER

:sting Officer

EDWARD J. BRENNER
Commissioner of Patents